(No Model.)
A. F. LENT & T. E. TERRELL.
HARNESS.
No. 550,452. Patented Nov. 26, 1895.
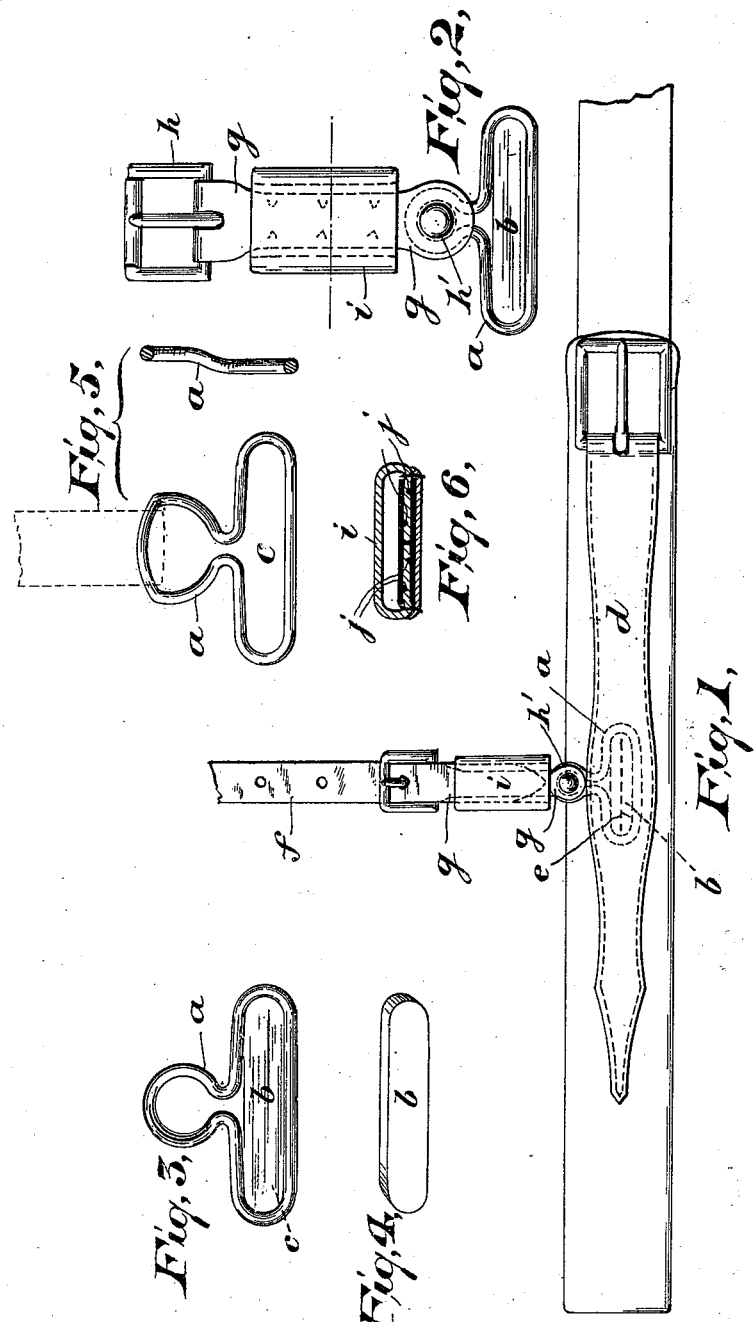
Witnesses
Robert Sollberger
Beatrice Charles
Inventors,
Alvah F. Lent,
Thomas E. Terrell,
By Drake & Co. Atty's

United States Patent Office.

ALVAH F. LENT AND THOMAS E. TERRELL, OF NEWARK, NEW JERSEY.

HARNESS.

SPECIFICATION forming part of Letters Patent No. 550,452, dated November 26, 1895.

Application filed March 22, 1895. Serial No. 542,760. (No model.)

*To all whom it may concern:*

Be it known that we, ALVAH F. LENT and THOMAS E. TERRELL, citizens of the United States, residing at Newark, in the county of Essex and State of New Jersey, have invented certain new and useful Improvements in Harness for Horses; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to render the harness more effective, durable, and sightly than heretofore and to secure other advantages hereinafter referred to.

This invention relates to that class of harness known as "breast-collar" harness; and the invention consists in the improved loop and the parts connected therewith and in the manner of securing the same to one another, as herein set forth, and finally pointed out in the claim.

Referring to the accompanying drawings, in which similar letters of reference indicate corresponding parts in each of the several figures where they occur, Figure 1 represents a breast-collar and neck-strap embodying our improvements. Fig. 2 represents an enlarged view of the loop and certain parts connected therewith. Figs. 3, 4, 5, and 6 represent detail views.

In carrying out our invention we make the loop or part $a$ as shown in Figs. 3 or 5 and fasten the same to the breast strap or collar by placing a block of leather $b$ or other suitable material in the oblong space $c$ of the loop, then covering the said part of the loop and the block inserted therein with an ordinary strap $d$, then stitching the same to the breast strap or collar and securing the block between the two by means of a row of stitching $e$, passing through all the parts, as indicated by dotted lines in Fig. 1. By this means the loop is held immovably in position and is prevented from coming in contact with or injuring the upper seam, as will be understood upon reference to Fig. 1. We then connect the said loop with the neck-strap $f$ by means of a link $g$, of metal or other appropriate material, doubled upon itself around a buckle $h$ and securing said link pivotally at its opposite end by a rivet $h'$ to the loop, as shown in Fig. 2. If we make said link of metal, we may cover the same with leather or not, as may be preferred, and secure thereto a strap-loop $i$ to receive the end of the neck-strap, said strap-loop being attached by inserting its ends between the parts of the aforesaid link and securing the same by means of spurs $j$ and by stitching, as in Figs. 1, 2, and 6, or, if preferred, we may dispense with the link $g$ and connect the loop direct to the neck-strap, as indicated in Fig. 5.

By means of the construction shown in Fig. 1, when the harness is removed from the horse, the neck-strap, owing to the link working upon a pivot, will lie down upon and be parallel with the breast-strap, and so the harness may be readily hung up by the two in a neat manner instead of presenting the unsightly appearance of the neck-strap dangling loosely from the harness, and thus the latter is kept in better shape and from becoming kinky.

Having thus described our invention, what we claim, and wish to secure by Letters Patent, is—

In a harness of the character described, the combination with the breast collar and the neck strap, of the loop, $a$, and a link, $g$, composed of a strap doubled upon itself and adapted to carry a buckle at the flexed point and pivotally connected at its extremities with the loop, $a$, substantially as described, and for the purposes set forth.

In testimony that we claim the foregoing we have hereunto set our hands this 19th day of March, 1895.

ALVAH F. LENT.
    THOMAS E. TERRELL.

Witnesses:
 OLIVER DRAKE,
 ROBERT SOLLBERGER.